April 14, 1925.
M. A. LOKEY
FERTILIZER MIXER AND DISTRIBUTOR
Filed Sept. 29, 1924
1,533,435
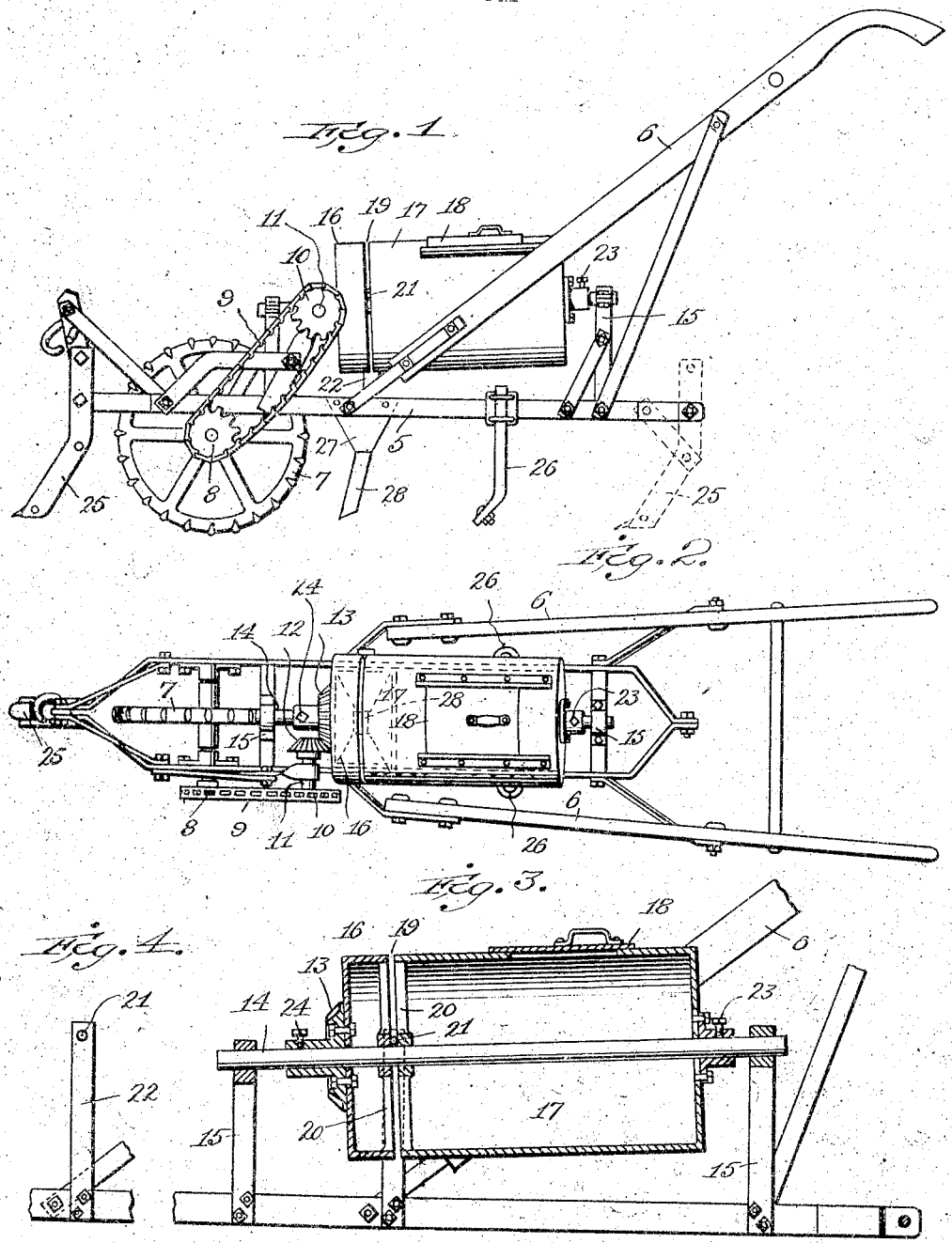

Patented Apr. 14, 1925.

1,533,435

UNITED STATES PATENT OFFICE.

MILTON A. LOKEY, OF HATCHER STATION, GEORGIA.

FERTILIZER MIXER AND DISTRIBUTOR.

Application filed September 29, 1924. Serial No. 740,521.

*To all whom it may concern:*

Be it known that I, MILTON A. LOKEY, a citizen of the United States of America, and a resident of Hatcher Station, county of Quitman, and State of Georgia, have invented certain new and useful Improvements in Fertilizer Mixers and Distributors, of which the following is a full and clear specification.

The object of this invention is to provide a simple apparatus which when pushed or drawn over a field will not only intimately mix the chemicals but will distribute the mixed chemicals evenly upon the soil, the apparatus being capable of use with or without soil-working implements, as more fully hereinafter set forth.

In the drawings—

Fig. 1 is a side elevation of an apparatus embodying my invention;

Fig. 2 is a plan view thereof;

Fig. 3 is a vertical sectional view thereof;

Fig. 4 is a side elevation of the slot-clearer standard.

Referring to the drawings annexed by reference characters, 5 designates a suitable frame provided with handles 6 for pushing it over the surface of the ground; 7, a traction-wheel journaled at the forward end of the frame and adapted to drive a sprocket-wheel 8 on which runs a sprocket-chain 9. This sprocket-chain engages at its upper end another sprocket-wheel 10 mounted on a transverse stub-shaft 11 journaled in a standard on the frame. The inner end of this stub-shaft 10 is provided with a bevel-gear 12 which meshes constantly with a bevel-gear 13 affixed to a shaft 14 journaled in bearings 15 mounted on the frame and inclined downwardly and forwardly.

Affixed to the shaft 14 is a hopper of cylindrical shape divided transversely into two sections, the forward section 16 being comparatively short and the rear section 17 being comparatively long, this latter section being provided at one point in its circumference with a filling-opening covered by a removable cover 18. The end walls of the sections 16 and 17 are imperforate, as likewise are the circumferential walls. These two cylindrical sections are of the same diameter and their open, adjacent ends are close together, forming a circumferential discharge-slot 19, this slot being open entirely around the hopper. The adjacent ends of the two cylindrical sections are supported on the shaft by means of spiders 20. It will be observed that by inclining the hopper downwardly and forwardly and by continually rotating it through the medium of the traction-wheel, the chemicals enclosed in the hopper will be constantly subjected to a tumbling action, while at the same time the chemicals will be gravitated forwardly and discharged through the slot 19. I have found in practice that this action not only thorougly mixes the chemicals, but insures an even discharge and distribution of the mixed chemicals. The tumbling hopper also tends to break up the lumps, as is obvious. What lumps remain in the cylinder may be removed through the door 18 for recrushing. To keep the circumferential discharge-slot 19 always clear, I provide a scraping-pin 21 mounted on the upper end of a standard 22 in such position as to enter the slot at one side of the hopper at a point about on a level with the shaft. This pin keeps the slot clear of chemicals that might stick around the edges of the slot and in that way insures an even discharge of the chemicals, irrespective of the nature or condition of the chemicals.

In order that the width of the discharge-slot 19 may be varied for different kinds of fertilizers, I make the two cylindrical sections of the hopper relatively adjustable toward and from each other. The large section 17 is rendered adjustable on the shaft by means of a set-screw 23 threaded through a hub attached to the rear end wall of the section. The forward cylindrical section is slidably attached to the shaft by means of a set-screw 24 which is threaded through the hub of bevel-wheel 13, this wheel being affixed to the end wall of the section 16. I have shown the fame 5 provided with two soil-working implements 25 and 26, the former being an opening-colter and the latter being a covering plow-foot. It will be understood, however, that any arrangement of soil-working implements may be employed, the arrangement depending, of course, on whether or not the fertilizer is to be distributed as a top-dressing or is to be plowed under.

If it desired to drill the fertilizing material, a hopper or chute 27 is secured across the frame 5 beneath the discharge-slot 19 of the main hopper, in a position to catch the falling material and drill it through the drill-spout 28 into the furrow made by the opening-plow 25 located at the front end of the frame in advance of the drill-spout, the side-plows 26 then acting to cover the material.

When the device is used for a cultivator and distributor, plow-foot 25 is removed to the dotted-line position shown in Fig. 1, at the rear end of the frame, and the drill-chute 27 and its spout 28 are entirely removed; then the material will be discharged directly to the ground through the discharge-slot 19 and spread in a wide swath equal at least to the diameter of the main hopper. The cultivator attachments 26 and 25 then mix the soil and fertilizer.

What I claim as new is:

In an implement for mixing and distributing fertilizer, a frame, a shaft journaled on the frame and inclining forwardly and downwardly, traction-wheel means for driving said shaft, a hopper mounted on said shaft and consisting of two cylindrical sections relatively adjustable on said shaft to provide an annular circumferential discharge-slot of the desired uniform width, and means for keeping said slot clear of accumulations of fertilizing materials, the forward end of the front section being closed and the two adjacent ends of the section being open, whereby the fertilizer will gravitate across the discharge-slot and into the forward section.

In testimony whereof I hereunto affix my signature.

MILTON A. LOKEY.

Witnesses:
C. D. CHITTY,
W. L. PAULLIN.